(12) United States Patent
Wüstefeld et al.

(10) Patent No.: US 6,427,441 B2
(45) Date of Patent: Aug. 6, 2002

(54) HYDROSTATIC VEHICLE DRIVE WITH CONTROL DEVICE AND CONTROL DEVICE FOR HYDROSTATIC DRIVES

(75) Inventors: Martin Wüstefeld, Neumünster; Jürgen Ploog, Quarnbek; Bernd Hames, Hensted-Ulzburg; Bernd Hänisch, Rendsburg, all of (DE)

(73) Assignee: Sauer-Danfoss Inc., Ames, IA (US)

( * ) Notice: Subject to any disclaimer, the term of this patent is extended or adjusted under 35 U.S.C. 154(b) by 4 days.

(21) Appl. No.: 09/751,767

(22) Filed: Dec. 29, 2000

(30) Foreign Application Priority Data

Jan. 4, 2000 (DE) ............................ 100 00 110

(51) Int. Cl.[7] ............................... F16D 31/02
(52) U.S. Cl. .......................... 60/444; 60/452
(58) Field of Search .................. 60/443, 444, 452, 60/494, 488

(56) References Cited

U.S. PATENT DOCUMENTS 6,082,107 A  *  7/2000 Schniederjan et al. ......... 60/444
6,167,702 B1 *  1/2002 Schniederjan ................ 60/444

* cited by examiner

*Primary Examiner*—F. Daniel Lopez
*Assistant Examiner*—Thomas E. Lazo

(57) ABSTRACT

A hydrostatic vehicle drive has a control (5) for controlling an output torque of the drive and another control device (5) for controlling the output torque of a hydrostatic drive, the control device (5) having a controllable pressure-limiting valve (6) by means of which the working pressure can be adjusted and which is used for sensitive control of the output torque of a hydraulic motor (3). The pressure-limiting valve (6) can be controlled by a proportionally adjustable pressure-reducing valve (7).

11 Claims, 2 Drawing Sheets

HYDROSTATIC VEHICLE DRIVE WITH CONTROL DEVICE AND CONTROL DEVICE FOR HYDROSTATIC DRIVES

Applicant claims foreign priority benefits of German Patent Application 100 00 110.6 filed Jan. 4, 2000.

FIELD OF THE INVENTION

This invention relates to a hydrostatic vehicle drive with an adjustable hydraulic pump and a hydraulic motor, the output torque of which can be varied by means of a control device, and from a control device for controlling an output torque of such a vehicle drive.

BACKGROUND OF THE INVENTION

In the case of hydrostatic drives, which comprise a variable-displacement pump and a fixed-displacement motor in a closed hydraulic circuit, the output torque on the output side is proportional to the working pressure produced in the system by the variable-displacement pump. Particularly in the case of hydrostatic vehicle drives for heavy vehicles, e.g. commercial vehicles and trucks, it is necessary to be able to control the output torque as sensitively as possible to allow accurate maneuvering, even with heavy vehicles. Sensitively controllable maneuvering is desired by the driver of the vehicle when engaging a trailer, for example.

A known control device for a hydrostatic drive controls the output torque of the hydraulic motor in such a way that the actual adjustment of the hydrostat is overlaid, and the output speed of the hydraulic motor is thus also affected. The change in the output speed due to the change in the output torque by the control device is often disadvantageous. For example, a heavy commercial vehicle does not come to a halt immediately when engaging a trailer upon meeting the resistance of the trailer. This happens because not only the output torque but also the output speed of the drive is changed, the latter change being undesirable. This makes precise maneuvering with heavy commercial vehicles more difficult since sensitive control of the output torque is not possible.

It therefore is a principal object of the invention to provide a hydrostatic vehicle drive with a variable-displacement pump and a fixed-displacement motor by means of which sensitive control of the output torque is possible, especially at low speeds, without affecting the output speed of the drive.

It is a further object of the present invention to provide a control device for hydrostatic drives which, though of simple construction, is effective and by means of which the output torque of the drive can be controlled in as sensitive a way as possible.

SUMMARY OF THE INVENTION

The hydrostatic vehicle drive according to the invention has an adjustable hydraulic pump, which can be adjusted proportionally by means of an adjusting device. This adjusting device can produce a variable working pressure, a hydraulic motor, which, together with the hydraulic pump and both connecting working lines, forms a closed hydraulic circuit. A control device is provided for controlling the output torque of the drive, the control device having a controllable pressure-limiting valve by means of which, using a control pressure, the working pressure can be adjusted and which can be controlled by means of a proportionally adjustable pressure reducing valve. This allows sensitive control of the output torque. In this way, it is possible to perform sensitive control of the output torque of the drive with just one pressure-limiting valve without the actual adjustment of the hydraulic pump being overlaid by the sensitive control and without the output speeds of the hydraulic motor being influenced in the process. Since the respective working pressure in the working lines in the hydrostatic circuit of the vehicle drive is proportional to the output torque produced by means of the hydraulic motor, sensitive control of the output torque can thus be achieved by means of the controllable pressure-limiting valve, even with hydrostatic drives of heavy commercial vehicles or trucks.

Depending on the control of the pressure-limiting valve, the working pressure of the closed hydraulic circuit is reduced or increased by means of the adjusting device. This has the effect that the torque on the output side of the hydraulic motor, which is designed as a fixed-displacement motor, is increased or reduced proportionally in accordance with the control signal. The pressure-limiting valve of the control device is controlled by a proportionally adjustable pressure-reducing valve, using a control signal, thereby allowing extremely sensitive control. By means of the control pressure, which can thus be varied in a sensitive manner, the working pressure of the hydraulic system can be varied in a correspondingly sensitive manner. The hydrostatic vehicle drive of this invention is furthermore advantageous not only because the control device allows even heavy vehicles to be maneuvered precisely at low speeds but also because the control device can be constructed with a small number of simple components and can be of correspondingly compact construction. The sensitively controllable vehicle drive operates reliably and almost without wear and can be constructed with simple hydraulic components.

The pressure-limiting valve has a pilot control stage. As a result, the control pressure of the pressure-limiting valve can be held constant in a sensitive manner, even in the case of widely differing delivery volume flows, thus allowing even more sensitive control of the output torque at the hydraulic motor. Furthermore, this ensures that the output torque proportional to the working pressure in the working lines is held constant in a precise manner. The resulting vehicle drive can thus be controlled in an extremely sensitive manner; that is controllable in the sense of being variable in a sensitive manner and capable of being held constant in a sensitive manner.

According to another aspect of the invention, the pressure-reducing valve is electrically controllable. As a result, the hydrostatic vehicle drive can be controlled by means of electrical control signals. This is advantageous, for example, when the control device is operated at a location remote from the vehicle drive. All that are required are electrical leads from the pressure-reducing valve to the location of control operation, e.g. a joystick.

According to another aspect of the invention, the pressure-reducing valve is mechanically or hydraulically controllable. In certain applications in which electrical control is not desired because of ambient conditions, it may be advantageous to control the pressure-reducing valve using mechanical or hydraulic signals. In the case of hydraulic control, it is furthermore advantageous that, the vehicle drive comprises exclusively hydraulic components, thus simplifying the production and maintenance of the drive. The explosion-proof character of a hydraulically controlled vehicle drive is furthermore advantageous. In yet other areas of application, mechanical control of the pressure-reducing valve, may be advantageous. Mechanical control has the advantage that it can be implemented much more economically.

According to another aspect of the invention, the pressure-limiting valve is used for high-pressure limitation of the working pressure in the hydraulic circuit. In this case, the pressure-limiting valve of the control device performs a dual function, namely, control and high-pressure limitation, leading to a reduction in the number of components required in the vehicle drive. Otherwise, separate high-pressure limiting valves are namely provided in the hydraulic circuit in order to prevent the permissible maximum working pressure in the working lines and in the system from being exceeded. In this refinement, the working pressure can be controlled in a sensitive manner in a certain pressure range by adjusting the adjusting device of the hydraulic pump while, if the maximum permissible working pressure is exceeded, the control function ceases and the pressure-limiting valve lowers the working pressure to a permissible level again.

According to another aspect of the invention, the hydraulic motor is reversible and a shuttle valve is arranged upstream of the proportional pressure-limiting valve. This allows sensitive control of the output torque in the case of a bidirectionally operated hydrostatic vehicle drive since the higher working pressure in each case is automatically controlled by means of the control device. Sensitive control of the output torque thus works in both directions of the hydrostatic circuit but only one pressure-limiting valve is required. The hydrostatic vehicle drive is thus of extremely simple construction, is easy to implement and provides sensitive control of the output torque. The control device for controlling the output torque of a hydrostatic drive, especially at low speeds, has a controllable pressure-limiting valve by means of which the working pressure of the hydrostatic drive can be adjusted. The pressure-limiting valve is controllable by means of a proportionally adjustable pressure-reducing valve. The control device has the advantage that it is possible, using just one pressure-limiting valve, to produce a control pressure which allows sensitive control of the output torque of a hydrostatic drive. At the same time, control of the output torque has no effect on the output speed of a hydrostatic drive —only the output torque is varied in accordance with the sensitively adjustable control pressure. The control device has only simple hydraulic components, and can be implemented at low cost. It is suitable for use in heavy vehicles with a hydrostatic drive since no more sensitive control of the output torque would be possible when compared with previously known devices.

According to a refinement of the control device, the pressure reducing valve is electrically controllable. In this case, the proportional adjustment of the pressure-reducing valve can be accomplished by means of electrical signals. The operating component for the control device, for example, can be arranged remote from it, e.g. in the cab of a vehicle. There need only be electrical leads from the operating component to the control device. The pressure-reducing valve of the control device can be adjusted electrically in a proportional manner.

As an alternative to the foregoing, the control device can advantageously be mechanically or hydraulically controllable. The advantage of mechanical control is to be seen in its economy of implementation and the simplicity of its structural design, while hydraulic control of the pressure-reducing valve has the advantage that the control device consists exclusively of hydraulic components and that these control devices can be used even in ambient conditions which involve a high risk of explosion.

According to another refinement, the pressure-limiting valve is pilot-controlled by means of a pilot-control stage. This allows the control pressure that can be produced by means of the pressure limiting valve to be varied in an even more sensitive manner. Moreover, it also allows larger control volume flows to be controlled in a sensitive manner.

According to another advantageous refinement of the invention, the pressure-limiting valve is used for high-pressure limitation of the working pressure of the hydrostatic drive. This means that there is no need to provide separate high-pressure limiting valves in the hydrostatic drive: the control device thus reduces the number of components required for a hydrostatic drive to be controlled by it.

DESCRIPTION OF THE PREFERRED EMBODIMENT(S)

Figure 1:
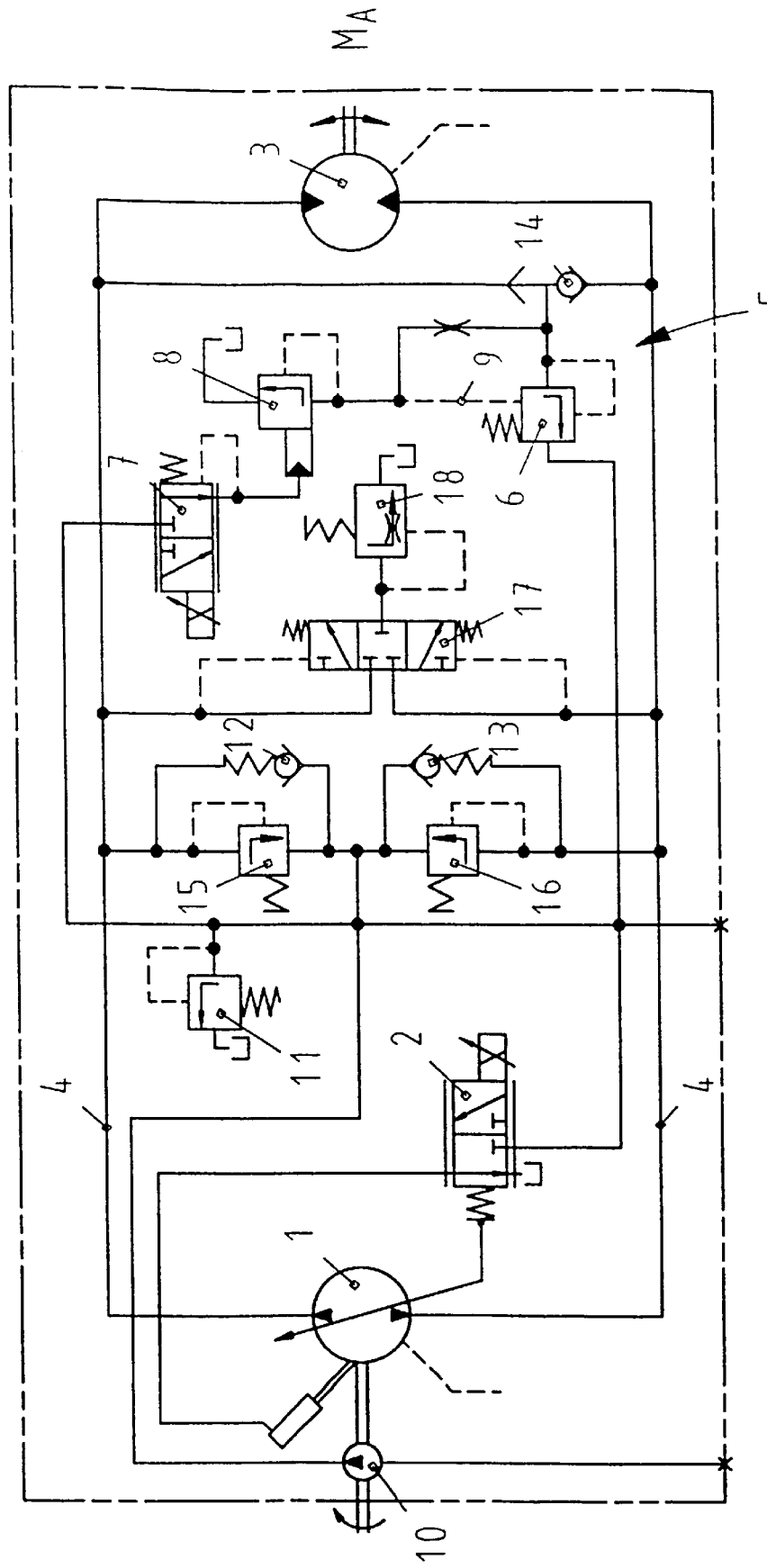
FIG. 1 shows a hydraulic circuit diagram of an exemplary embodiment of a reversible hydrostatic vehicle drive with sensitive torque control.

The hydrostatic vehicle drive illustrated in FIG. 1 has a variable hydraulic pump 1, which can be adjusted proportionally by means of an adjusting device 2 to adjust the delivery volume flow and thus the working pressure in the working lines 4 of the system. A reversible hydraulic motor 3, which is designed as a fixed-displacement motor, is provided on the output side. The control device 5 (FIG. 2) is used for sensitive control of the output torque $M_A$ of the hydraulic motor 3 and has a pressure-limiting valve 6, an electric proportional pressure-reducing valve 7 and a pilot-control stage 8. To actuate the control device 5, the pressure-reducing valve 7 is controlled by means of a control signal. The pressure-reducing valve 7 is an electrically controlled and proportionally adjustable valve. The pressure-reducing valve 7 controls the pressure-limiting valve 6 via the control line 9 by means of a pilot-control stage 8. In this context, the electrical activation of the pressure-reducing valve 7 can be performed by means of an operator device (not shown in the drawing), e.g. from the vehicle cab. In this way, it is possible to adjust the output torque $M_A$ on the output side at the hydraulic motor 3 by means of a control pressure which can be produced by the control device 5 and can be adjusted very sensitively, without the activation being superposed on the actual adjustment of the hydraulic pump. Here, the pressure-reducing valve 7 is controlled electrically but it could likewise be controlled hydraulically or mechanically. The vehicle drive has a shuttle valve 14, which is connected to the control device 5 and ensures sensitive control of both the working pressure in the working lines 4. The output torque at the torque at the motor 3 in both directions of delivery flow of the hydrostatic drive. In each case, the higher pressure is fed to the pressure-limiting valve 6 by the shuttle valve 14 for the purpose of sensitive control. The vehicle drive furthermore has a feed pump 10, by means of which hydraulic fluid is fed to the hydraulically closed circuit via feed valves 12, 13 and via a feed-pressure limiting valve 11 to compensate for leakage losses, for example. In this embodiment illustrated in FIG. 1, there are two high-pressure limiting valves 15, 16, these preventing the maximum permissible working pressure in the working lines 4 from being exceeded on both sides of the reversible circuit. As an alternative, however, the pressure-limiting valve 6 can also perform the function of high-pressure limitation in the working circuit of the drive. In this case, the two high-pressure limiting valves 15, 16 are superfluous and can be omitted. This advantageous aspect of the invention leads to a reduction in the number of components required to implement a hydrostatic vehicle drive according to the invention. There is furthermore a flushing spool valve 17 and a flush-pressure limiting valve 18, which can be connected to the working lines 4 to flush one side in each case.

Figure 2:
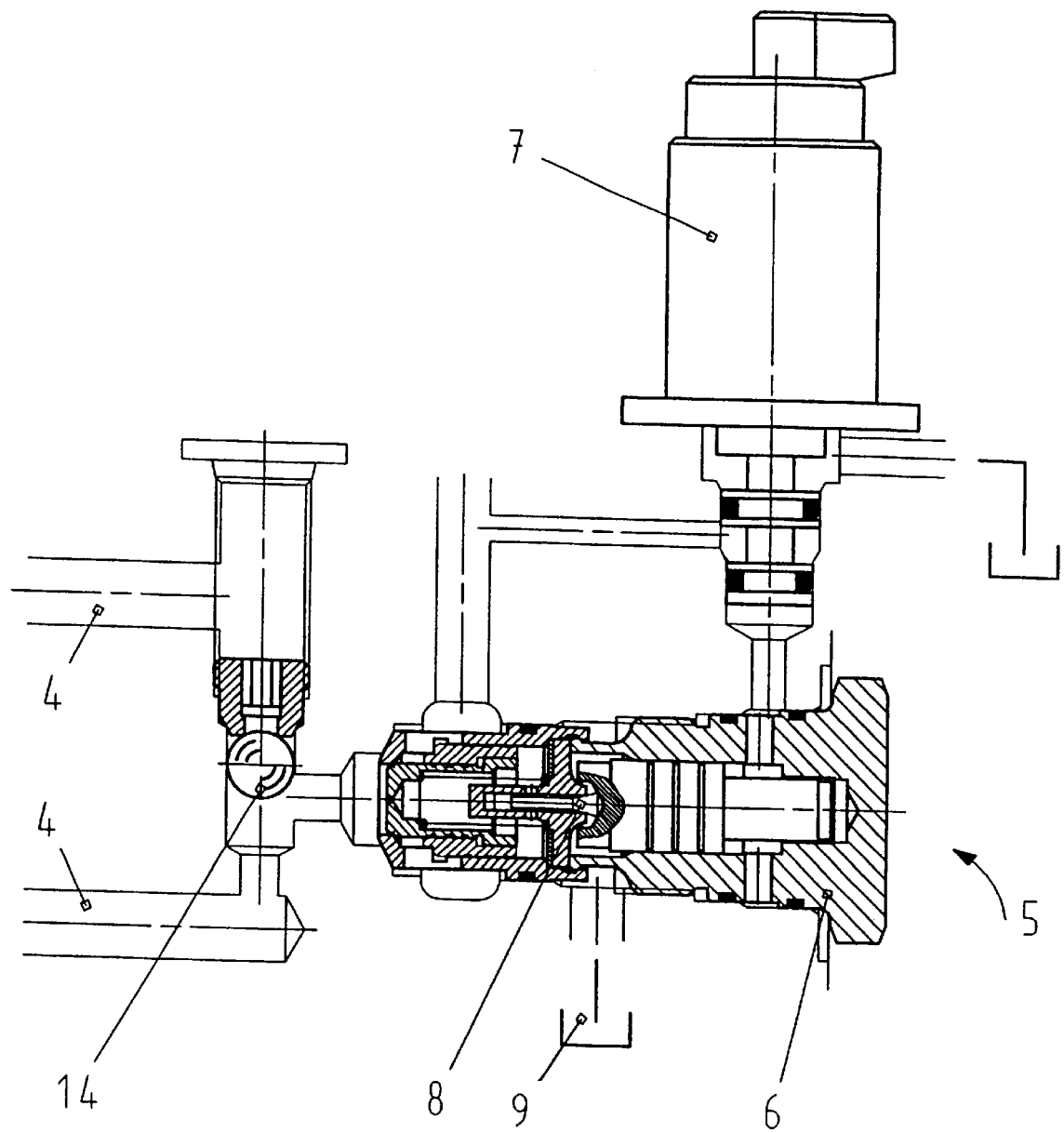
FIG. 2 shows a partially sectioned plan view of a control device with a pilot-controlled pressure-limiting valve and electric proportional activation.

FIG. 2 shows a partially sectioned plan view of a control device with a pilot-controlled pressure-limiting valve. In this embodiment, the control device 5 has a pressure-limiting valve 6, which is provided with a pilot-control stage 8. In the example shown here, the pressure-limiting valve 6 is controlled via an electric proportional pressure-reducing valve 7. To make the control device suitable for use in a hydraulic circuit with two directions of flow—i.e. a reversible hydrostatic vehicle drive—a shuttle valve 14 is provided, this valve ensuring that the respectively higher pressure from the working lines 4 is controlled by the control device 5. As an alternative, proportional pressure-reducing valve 7 can also be controlled hydraulically or mechanically.

List of Reference Symbols
1 Adjustable hydraulic pump
2 Proportional adjusting device of the hydraulic pump
3 Hydraulic motor
4 Working lines
5 Control device
6 Pressure-limiting valve
7 Pressure-reducing valve
8 Pilot-control stage, pressure-limiting valve
9 Control lines
10 Feed pump
11 Feed-pressure limiting valve
12,13 Feed valves
14 Shuttle valve
15,16 High-pressure limiting valves
17 Flushing spool valve
18 Flush-pressure limiting valve
$M_A$ Output torque

What is claimed is:

1. A hydrostatic vehicle drive, comprising, an adjustable hydraulic pump (1), which can be adjusted proportionally by means of an adjusting device (2) to produce a variable working pressure,
   a hydraulic motor (3) in a closed hydraulic circuit,
   working lines (4) between the hydraulic pump (1) and the hydraulic motor (2),
   and a control device (5) for controlling an output torque of the drive,
   a controllable pressure-limiting valve (6) on the control device (5) so that the working pressure can be adjusted and can be controlled by means of a proportionally adjustable pressure-reducing valve (7) to allow sensitive control of the output torque at the hydraulic motor (3).

2. The hydrostatic vehicle drive as claimed in claim 1, wherein the pressure-limiting valve (6) has a pilot-control stage (8).

3. The hydrostatic vehicle drive as claimed in claim 1, wherein the pressure-reducing valve (7) is electrically controllable.

4. The hydrostatic vehicle drive as claimed in claim 1, wherein the pressure-reducing valve (7) is mechanically or hydraulically controllable.

5. The hydrostatic vehicle drive as claimed in claim 1, wherein the pressure limiting valve (6) is used for high-pressure limitation of the working pressure in the hydraulic circuit.

6. The hydrostatic vehicle drive as claimed in claim 1, wherein the hydraulic motor (1) is reversible and a shuttle valve (14) is arranged upstream of the proportional pressure limiting valve (6).

7. A control device for the sensitive control of the output torque of a hydrostatic drive, comprising
   a drive having at least one proportionally adjustable hydraulic pump and one fixed-displacement hydraulic motor, which are connected to one another by working lines,
   a controllable pressure-limiting valve (6), for adjusting the working pressure of the hydrostatic drive,
   the pressure-limiting valve (6) being controllable by means of a proportionally adjustable pressure-reducing valve (7) connected to pressure-limiting valve to control the same.

8. The control device as claimed in claim 7, wherein the pressure-reducing valve (7) is electrically controllable.

9. The control device as claimed in claim 7, wherein the pressure-reducing valve (7) can be controlled mechanically or hydraulically.

10. The control device as claimed in one of claim 7, wherein the pressure-limiting valve (6) is pilot-controlled by means of a pilot-control stage (8).

11. The control device as claimed in claim 7, wherein the pressure-limiting valve (6) is operative for high-pressure limitation of the working pressure in the hydraulic circuit of the drive.

* * * * *

UNITED STATES PATENT AND TRADEMARK OFFICE
CERTIFICATE OF CORRECTION

PATENT NO. : 6,427,441 B2  
DATED : August 6, 2002  
INVENTOR(S) : Martin Wustefeld, Jurgen Ploog, Bernd Hames and Bernd Hanisch It is certified that error appears in the above-identified patent and that said Letters Patent is hereby corrected as shown below:

<u>Column 6,</u>  
Delete lines 1 through 6, and insert the following:  
-- wherein the control device includes a pressure-limiting valve (6) that adjusts the working pressure and is controlled by a proportionally adjustable pressure-reducing valve (7) to allow sensitive control of the output torque at the hydraulic motor (3). --  
Delete lines 24 through 47.

Signed and Sealed this

Twenty-ninth Day of October, 2002

Attest:

Attesting Officer

JAMES E. ROGAN  
*Director of the United States Patent and Trademark Office*